Nov. 18, 1969  N. L. FUQUA  3,478,670
AIR OPERATED SINGLE CUP COFFEE BREWER
Filed June 28, 1968  3 Sheets-Sheet 1

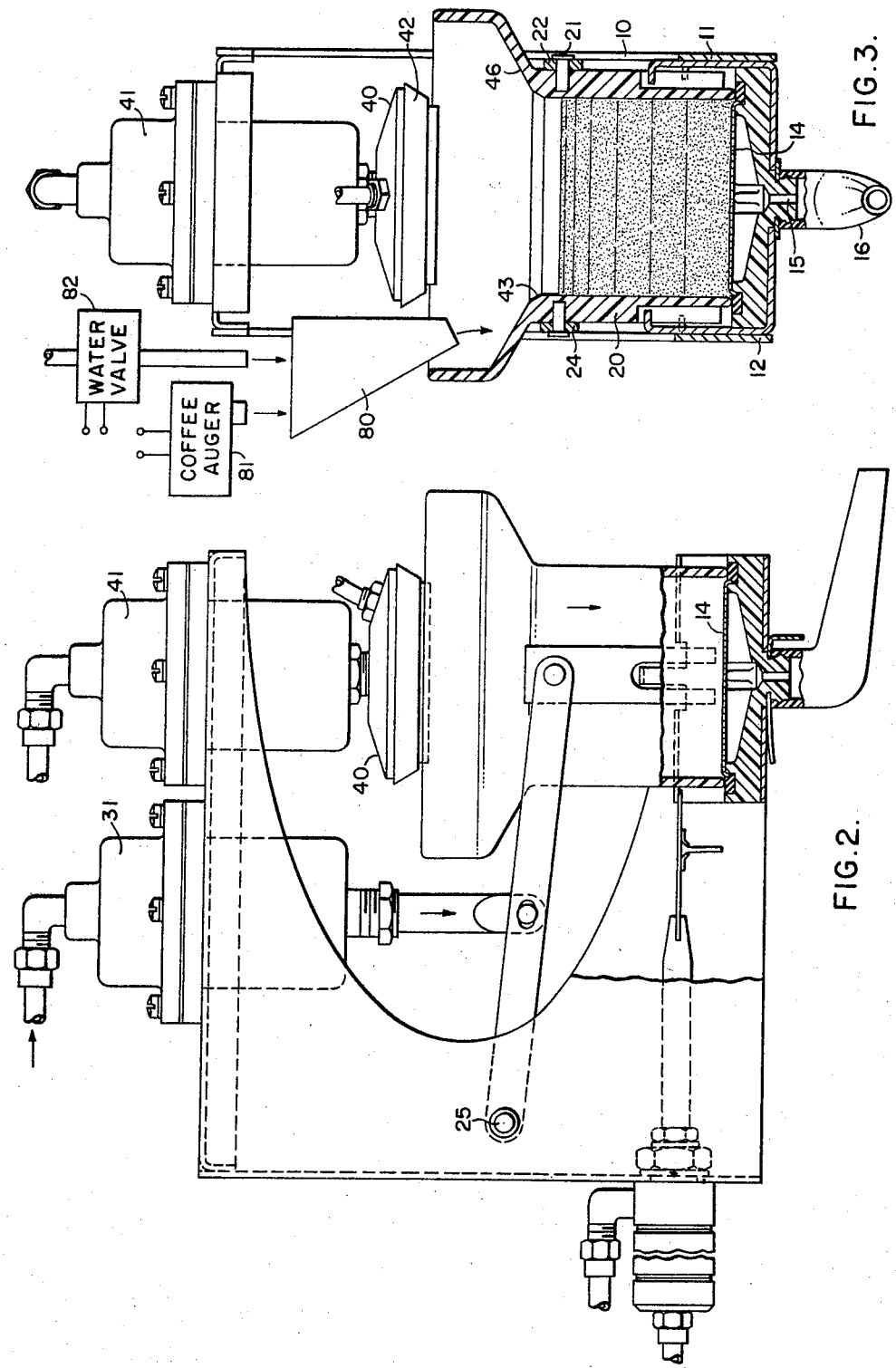

Nov. 18, 1969     N. L. FUQUA     3,478,670

AIR OPERATED SINGLE CUP COFFEE BREWER

Filed June 28, 1968     3 Sheets-Sheet 3

WITNESSES

INVENTOR
Norman L. Fuqua
BY
ATTORNEY

United States Patent Office 3,478,670
Patented Nov. 18, 1969

3,478,670
AIR OPERATED SINGLE CUP COFFEE BREWER
Norman L. Fuqua, Wilbraham, Mass., assignor to Westinghouse Electric Corporation, Pitttsburgh, Pa., a corporation of Pennsylvania
Filed June 28, 1968, Ser. No. 741,027
Int. Cl. A47j 31/32
U.S. Cl. 99—283                              13 Claims

ABSTRACT OF THE DISCLOSURE

An air operated single cup coffee brewer for vending machines including a fixed lower platform with filter screen and brewed coffee discharge opening and with an open ended brew cylinder normally spaced above the platform but movable onto the platform in sealing relation together with means to thereafter add ground coffee and hot water to the cylinder. A stopper is movable into sealing relation with the upper end of the cylinder and air under pressure is passed through the stopper to force brewed coffee through the screen following which the stopper and cylinder are returned to their normal positions and a wiper is reciprocated across the screen to remove spent coffee grounds.

Cross references to related patent applications

The copending patent application of Carl R. Merola and Wesley Mamrose Ser. No. 694,550 filed Dec. 29, 1967 and assigned to the same assignee as the subject invention discloses a specific arrangement for adding coffee and water to an air operated coffee brewer of a general type similar to that forming the subject of the present invention.

Background of the invention

Coin controlled vending machines for vending cups of individually brewed hot coffee are well known. In fact their popularity is so great that they are in almost continuous usage during a working day in many installations. It is therefore very important that a simple and reliably operating coffee brewing mechanism be provided. Furthermore, such brewing mechanisms should be easily cleaned and should stay relatively clean during a time period of a considerable number of brew cycles between the periods of routine servicing of the vending machine. It is also extremely important that a well brewed cup of coffee be vended as quickly as possible so that as many customers as possible can be served in succession in a given period of time.

Prior art

There are many prior patents showing various types of air pressure operated coffee brewers, some of which are suitable for use as a single cup brewer in a coffee vending machine. Prior patents which applicant believes may be pertinent but which do not show the simple and reliable arrangement of his invention are U.S. Patent 2,899,885, issued to Thompson on Aug. 18, 1959 and U.S. Patent 2,827,845 issued to Richeson on Mar. 25, 1958, both patents being classified in Class 99 Subclass 289 of the United States patent classification. In addition U.S. Patent 2,887,038 issued to Rosander on May 19, 1959 and classified in Class 99 Subclass 307 together with U.S. Patent 3,122,988 issued to Rota on Mar. 3, 1964 and classified in Class 99 Subclass 302 may be of interest.

Summary

In accordance with the invention, a sheet metal frame is arranged to support a horizontally positioned platform having a filter screen on its upper surface overlying a brewed coffee outlet conduit. A brewing cylinder open at both ends and having a closed volume approximately equal to or slightly more than a large cup of coffee is movably supported on the frame to be normally positioned with its lower end spaced above the filter screen surface of the platform and is movable down to a sealing relation on the platform. A stopper, adapted to close the upper end of the brew cylinder after the cylinder has been seated on the platform and after hot water and coffee have been added, is movably supported on the frame to be normally positioned to be spaced above the open upper end of the cylinder in its rest position. Means to move the stopper downward from its normal position into sealing relation to the upper open end of the brew cylinder after the coffee and water have been added is also provided. The stopper is further provided with an opening connected by an air line to a source of air under an appropirate predetermined pressure which is valved into the cylinder at the desired time in the brew cycle to force or extract brewed coffee from within the cylinder through the filter and the brewed coffee outlet of the platform. A wiper blade is movably mounted on the frame and is adapted to be reciprocated across the filter screen to remove spent coffee grounds therefrom after the stopper and the brew cylinder are returned to their normal positions near the end of a brew cycle. A cycle timer, which may be of more or less conventional design, is arranged to control the operations of all of the movable parts of the brewer in a predetermined sequence during each brew cycle. Since the brewer of the invention requires air under pressure to force brewed coffee through the filter screen, the preferred arrangement of the invention employs a pair of air operated spring return air cylinders that are respectively operable to move the brew cylinder onto the platform and move the stopper towards the upper sealing surfaces of the brew cylinder when air is valved thereto during the brew cycle and to return the cylinder and stopper to their normal positions when air is released therefrom later in the brew cycle. Also, the wiper may be preferably operated by a double acting air cylinder to which air pressure is appropirately valved at the end of the brew cycle. Thus a single source of air under pressure provides most of the power needed to operate the coffee brewer of the invention. In order to facilitate the introduction of coffee and hot water into the brew cylinder at the desired time in the brew cycle in a manner to improve the brewing contact of hot water and coffee and also in a manner to keep the interior walls of the brew cylinder relatively clean, the brew cylinder relatively clean, the brew cylinder wall at its upper end is flared outwardly to a circumference larger than the circumference of the stopper, and a chute is arranged to deposit coffee and hot water on the land of the flared portion of the cylinder in a manner to tangentially mix and swirl the hot water and coffee around the interior walls of the brew cylinder when filling the cylinder. Thus, some brewing of coffee takes place even during the filling of the brew cylinder and the upper sealing surfaces of the cylinder which are at the base of the flared portion are kept clean for adequate sealing with the stopper.

Further objects, features and advantages of the invention will be apparent with reference to the following specification and drawings.

Brief description of the drawings

FIG. 2 is a view similar to FIGURE 1 but showing only the coffee brewer and with the parts in the position assumed early in the brew cycle with the brew cylinder seated on the brewing platform but the stopper still in its raised normal position;

FIG. 3 is a view similar to FIGURE 2 as seen from the front and showing diagrammatically the means for charging the brew cylinder with coffee and hot water before the brew cylinder stopper is lowered later in the brew cycle;

Figure 1:
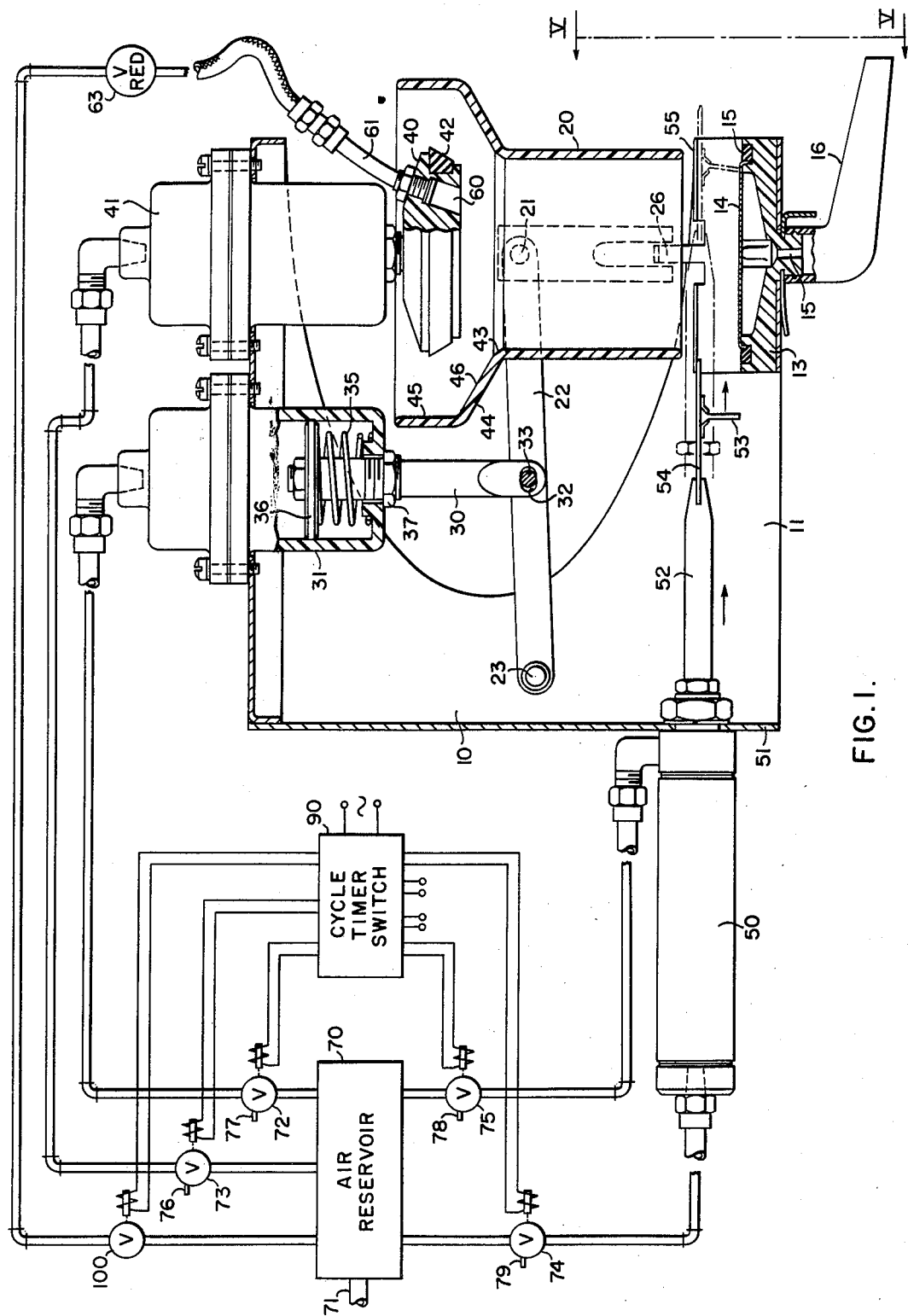
FIGURE 1 is a side elevation partly in section of the brewer of the invention and also showing the air piping and valves together with the cycle timer switch and the air reservior with the brewer parts of the invention shown in their normal positions before the start of a brew cycle.

Description of the preferred embodiment of the invention

The air operated single cup coffee brewer of the invention is particularly intended for use in coin controlled coffee vending machines and such machines are comprised of a vending cabinet containing not only the brewer apparatus but many other relatively complicated items such as the coin accepting and change making apparatus, the hot water heater, containers of cream, sugar, powdered chocolate, powdered soup, cup dispensing mechanism, mixing tray for mixing brewed coffee with powder, cream or sugar, and ventilating arrangements for preventing the powdered ingredients from becoming moist and clogging. Since all of the related apparatus referred to may take various forms and their description is not necessary for an understanding of the coffee brewer of the invention, in order to simplify this description and the drawings only the coffee brewing mechanism of the invention will be shown and described. The coffee brewer of the invention is intended to brew coffee by mixing ground coffee and hot water together in a brew cylinder and extracting brewed coffee through a filter screen in response to the application of air under pressure within the brew cylinder. Therefore since a source of air under pressure is required for extraction, the preferred form of the invention also provides that most of the movable parts of the coffee brewer be operated by air pressure responsive devices. However it should be understood that various ones of the air operated devices for moving the movable parts of the coffee brewer during a brew cycle may be changed to some other form of powdered mechanism without departing from the spirit of the invention in its most basic concept.

Referring now to the drawings for a general description of the invention, a sheet metal frame 10 is provided with lower arms 11 and 12 supporting a generally horizontally positioned platform 13 on the upper surface of which is positioned a disk shaped filter screen 14 overlying a brewed coffee discharge outlet 15 connected to the conduit 16 which extends to the mixing tray of the vending machine (not shown). It will be understood that brewed coffee passing through the outlet conduit 16 into the mixing tray is thereafter mixed with the desired amounts of cream and sugar as ordered by the customer before being deposited in a cup available to the customer. It will be noted that the brewed coffee outlet 15 underlying the filter screen 14 is of relatively small diameter or area compared to the diameter or area of the opening immediately underlying and corresponding to the area of the filter screen 14. The relative size of the coffee outlet 15 is a matter of design choice but it is desired to point out that, with a smaller opening 15, a greater the length of time would be required for extracting the coffee through the filter screen 14. Thus the length of the brewing time in the brewing cycle for a given charge of coffee and hot water may be predetermined to a certain extent in a manner to control the flavor of the brewed coffee. The size and number of the openings in the filter screen 14 is a matter of design choice, well known to those skilled in the art, and is determined on the basis of the type of coffee grind and the desired speed with which the coffee liquid is to be extracted through the filter screen. The coffee filter screen 14 is not shown by the drawings in plan but it is preferable that the screen be disk shaped and of slightly less diameter than the interior diameter of the lower end of the coffee brew cylinder 20. Of course if a non-circular brew cylinder 20 is employed, then the filter screen 14 would have a similar non-circular configuration. Surrounding the outer circumference of the filter screen 14 is a ring of gasket material 15 upon which the lower end of the coffee brew cylinder 20 is seated in sealing relation during the brew cycle.

The coffee brew cylinder 20 is pivotally mounted at 21 on the outer end of the arm 22 which in turn is pivotally mounted at its other end 23 on the sheet metal frame 10. In the preferred arrangement, an oppositely positioned arm 24 is provided so that the coffee brew cup 20 is supported between the ends of parallel pivoted arms 22 and 24. In order to guide the lower end of the coffee brew cylinder 20 when it moves downwardly onto the brew platform 13, guide pins 26 and 27 as seen more clearly in FIGS. 3–5 of the drawings engage appropriate slots 28 and 29 formed on the lower side wall portions of the brew cylinder 20.

The brew cylinder 20 is normally maintained in a position spaced above the brewing platform 13 as shown by FIG. 1 of the drawings but is movable downward upon pivoting the arms 22 and 24 downward about their pivot points 23 and 25. For this purpose, the piston rod 30 of the air cylinder 31 is connected at 32 to a cross bar 33 spanning the parallel arms 22 and 24. A return coil spring 35 is positioned within the air cylinder 31 to normally urge the air piston 36 upward and maintain the arms 22 and 24 with the brew cylinder 21 in the normal raised position shown by FIG. 1 of the drawings when air under pressure is not supplied to the air cylinder 31. The exact height of the normal position of the brew cylinder 21 may be predetermined by the lock nut 37 acting as a stop for the upward movement of the piston rod 30 and piston 36. When air under pressure is supplied to the cylinder 31 the piston 36 will be forced downward to pivot the arms 22 and 24 about their bearings 23 and 25 downwardly and move the brew cylinder 20 downward into sealing relation with the gasket 15 of the brew platform 13.

In order to close the upper end of the brew cylinder 20 after a charge of coffee and hot water has been added thereto during the brew cycle, a stopper disc 40 is provided to be maintained in the normal raised position above the brew cylinder 20 as shown by FIG. 1 of the drawings by a spring return air cylinder 41 of substantially identical construction to that of the spring return air cylinder 31 previously described. The outer rim of the stopper 40 is provided with gasket sealing material 42 as shown to engage the sealing surface 43 of the brew cylinder 20 which is formed at the base of the land 44 of the flared upper portion 45 of the brew cylinder which is then enlarged to a greater circumference than the circumference of the stopper 40. When air under pressure is supplied to the air cylinde 41, the stopper 40 will be lowered into sealing engagement with the upper open end of the brewer cylinder 20 and when air is released from the cylinder 41, its return spring (not shown but similar to the spring 35 of cylinder 31) will return the stopper 40 to its normal raised position as shown by FIG. 1 of the drawings.

A double acting air cylinder 50 is mounted on the lower end wall 51 of the sheet metal frame 10 with its piston rod 52 extending as shown. A wiper blade 53 is attached to the end of the piston rod 52 by a resilient arm 54 and the arrangement is such that the normal position of the wiper blade 53 is as shown by FIG. 1 of the drawings. At the end of each brew cycle, air under pressure is appropriately valved to the double acting cylinder 50 in a manner to reciprocate the wiper blade 53 across the filter screen 14 while the brew cup 20 is in its normal raised position as shown. Thus the spent coffee grounds that have been deposited on the filter screen 14 during the brew cycle are removed therefrom to drop downward by gravity to a waste bucket (not shown) positioned in the vending cabinet beneath the brewer platform 13 in any appropriate manner.

The stopper disc 40 is provided with an opening therethrough as shown at 60 through which air under pressure is supplied from the air pipe 61. For purposes of economy ond reliability the diameters of the pistons within the air cylinders 31 and 41 are less than the diameter of the stopper 40. Stated another way the area of applied pressure for the pistons in the air cylinders 31 and 41 is less than the area of the stopper disc 40 and the filter disk 14. Therefore, when pressurizing the interior of the brew cylinder 20 during the brew cycle it has been found necessary to predetermine the air pressure passing through the conduits 61 and stopper disc 60 into the brew cylinder to be considerably less than the pressure in the servo cylinders 31 and 41. For this purpose pressure reducing and regulating valve 63 is provided in the air pressure line to the conduit 61 so that the sourceof pressure in the air reservoir 70 which may be in the order of 80 pounds per square inch is reduced to a pressure of only about 5 pounds per square inch within the brew cylinder 20.

As is shown by FIG. 3 of the drawings a chute 80 is supported in any suitable manner (not shown in detail) in a position to receive ground coffee from the electrically operated coffee auger 81 and hot water from the electrically controlled hot water valve 82 and direct these ingredients onto the land 46 of the enlarged neck of the opening at the upper end of the coffee cylinder 20. The arrangement of the chute 80 for depositing the mixture of ground coffee and hot water onto the land 46 of the brew cylinder 20 causes a tangential and swirling action with thorough mixing of the coffee and hot water as the coffee ond hot water fill the brew cylinder to the level shown by FIG. 3 of the drawings. This tangential swirling motion not only improves the mixing of the coffee and hot water to give a better coffee brew, but it serves to clean the sealing surface 43 of the interior cylinder walls of the coffee brew cylinder 20 so that effective action can be obtained with the seal-gasket 42 of the stopper disc 40 during the brew cycle.

Figure 4:
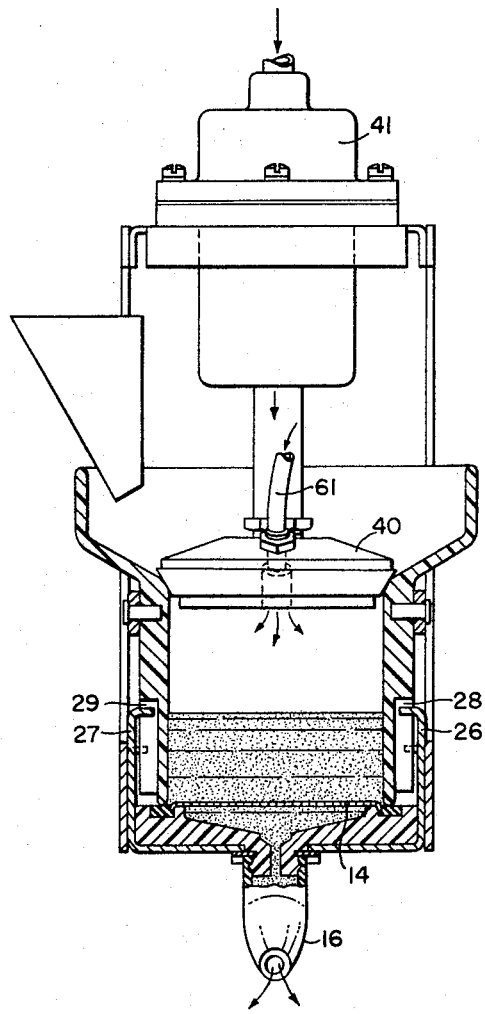
FIG. 4 is a view similar to FIGURE 3 but showing the parts in the position assumed with the stopper lowered into sealing relation with the cylinder and with air pressure forcing and extracting brewed coffee through the filter screen of the platform to the coffee outlet conduit.
Figure 5:
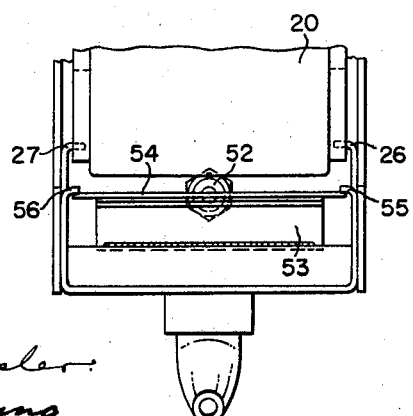
FIG. 5 is a fragmentary elevational view of the lower end of the brewer as seen from the front and showing the detail of the wiper blade as it engages the filter screen for purposes of removing spent coffee grounds at the end of the brew cycle.

It is of course necessary to operate the movable parts of the brewer in a predetermined sequence during each brew cycle and for such purposes an electric motor driven cycle timer switch which may be of conventional form well known in the art is provided as shown at 90 by FIG. 1 of the drawings. The air reservoir 70 is supplied with air at a predetermined pressure through the inlet pipe 71 from a suitable air compressor (not shown). The air from the reservoir 70 is conected by suitable pipes to the air control valves 72-75 and 100 which are of a type which when operated are open to supply air from the reservoir 70 to the appropriate air operated cylinder or device controlled thereby but when closed are effective to valve any air from the interior of the associated air cylinders and devices to atmosphere through the vents 76-79. The air control valve 100 differs from valves 72-75 in that it simply supplies air to the pressure reducing valve 63 whenever it is energized, it being unnecessary to vent the air from the pressure reducing valve 63 at other times during the brew cycle since the stopper 40 will be raised from its sealing relation with the vrew cylinder 20 at those times. The cycle timer switch 90 is arranged to sequentially operate the valves 72-75 and 100 in a monner to first supply air under pressure to the cylinder 31 to lower the brew cylinder 20 onto the brewing platform 13 as shown by FIGS. 2-4 of the drawings. The next operation of the cycle timer switch 90 is to energize the electromagnetically controlled hot water valve 82 and the electrically operated coffee auger 81 to discharge the mixture of coffee and water into the brew cylinder 20 while it is in the position shown by FIGS. 2 and 3 of the drawings. The next movement of the cycle timer switch 90 during the brew cycle causes the operation of valve 73 to pressurize the air cylinder 41 and move the stopper 40 down into sealing relation with the brew cylinder as shown by FIG. 4 of the drawings. Substantially at the same time or upon the next movement of the cycle timer switch 90 during the brew cycle, the valve 100 is operated to supply air under pressure through the pressure reducing valve 63 and the conduit 61 to the outlet 60 in the stopper 40 thus pressurizing the mixture of coffee and hot water within the brew cylinder as shown by FIG. 4 of the drawings and extracting brewed coffee through the filter screen 14 to the coffee discharge conduit 16. The next movement of the cycle timer switch 90 during the brew cycle recloses valves 72 and 73 to vent air cylinders 31 and 41 to atmosphere and closes valve 100 to stop the flow of air pressure to the pressure reducing valve 63. With the air cylinders 31 and 41 vented as described, their return springs such as the spring 35 raise the brew cylinder 20 and stopper disk 40 to their normal positions shown by FIG. 1 of the drawings. The next and last movement of the cycle timer switch 90 sequentially operates valves 74 and 75 to supply air to the double acting cylinder 50 in the appropriate manner for reciprocating the wiper blade 53 across the filter screen and remove the spent coffee grounds therefrom at the end of the brew cycle. In order to guide the wiper blade 53 and maintain a desired wiping pressure, the flange guides 55 and 56 as most clearly shown by FIGS. 1 and 5 of the drawings may be provided to engage the upper surface of the resilient wiper arm 54 in its movement across the filter screen surface 14.

It is believed that the operation of the air operated single cup coffee brewer of the invention should now be well understood considering the foregoing description. It is desired to point out however that an improved brewing operation is obtained in an extremely short brewing cycle by the arrangement of the invention wherein the ground coffee and hot water are mixed together as they are introduced into the brew cylinder 20 over the land 46 of the flared lip portion of the upper open end of the brew cylinder 20. It should also now be readily apparent that the coffee brewer of the invention is extremely simple and reliable in operation, there being no complex moving mechanisms and no complex cams and springs or gears as have been used with so many of the prior art brewer mechanisms known to applicant.

Various modifications will occur to those skilled in the art. Although electrically operated air control valves 72-75 and 100 are shown, it should be understood that this invention is not limited thereto and other operational forms of air control valves may be used.

I claim as my invention:

1. A pressure operated coffee brewer comprising, a frame, a platform mounted on said frame and having a filter screen overlying a brewed coffee discharge conduit, a brew cylinder open at both ends movably mounted on said frame to be normally positioned with its lower end spaced above said platform and movable downward into sealing relation to the upper surface of said platform, a stopper movably mounted on said frame to be normally spaced above the upper opening of said cylinder and movable downward in sealing relation to the upper opening of said cylinder when the cylinder is positioned in sealing relation on said platform, wiper means movably mounted on said frame to be reciprocated in wiping relation over said filter surface while said cylinder is in its normal position, first means to move said cylinder to and from said platform, second means to move said stopper to and from said cylinder, third means operable to pass air under pressure through said stopper, fourth means to reciprocate said wiper, and cycle timing means to control the operation of all of said first through fourth means in sequence during each brewing cycle whereby said first means moves said cylinder to the position with its lower end in sealing relation on said platform for introduction of coffee and water into the cylinder, said second means then moves said stopper into sealing relation with the upper end of said cylinder, said third means is then operated to pressurize the interior of said cylinder and force brewed coffee through said filter, said first and second means are then operated to move said cylinder and stopper back to their normal positions, and said fourth means is then operated to reciprocate said wiper over said filter screen to remove coffee grounds from the screen at the end of the brew cycle.

2. The invention of claim 1 in which said first and second means are air pressure operated cylinders with spring return mechanisms operable to move said cylinder and stopper downward in response to applied air pressure.

3. The invention of claim 2 in which the upper end of said cylinder is provided with a flared lip of greater circumference than the circumference of said stopper, and charge means is provided to be operable to deposit coffee and water on said lip, said cycle timer being responsive to operate said charge means during the brew cycle while said cylinder is in sealing relation on said platform and before said stopper is moved into sealing relation to the upper end of said cylinder.

4. The invention of claim 2 in which the area of the second means is less than the area of said stopper and said third means includes pressure regulating means to predetermine the air pressure in said cylinder during the coffee brewing cycle to be less than the air pressure in said second means.

5. The invention of claim 1 in which said fourth means is a double acting air pressure operated cylinder.

6. The invention of claim 5 in which the upper end of said cylinder is provided with a flared lip of greater circumference than the circumference of said stopper, and charge means is provided to be operable to deposit coffee and water on said lip, said cycle timer being responsive to operate said charge means during the brew cycle while said cylinder is in sealing relation on said platform and before said stopper is moved into sealing relation to the upper end of said cylinder.

7. The invention of claim 1 in which said first and second means are air cylinders with spring returns operable to move said cylinder and stopper downward in response to applied air pressure, and said fourth means is a double acting air cylinder.

8. The invention of claim 7 in which the upper end of said cylinder is provided with a flared lip of greater circumference than the circumference of said stopper, and charge means is provided to be operable to deposit coffee and water on said lip, said cycle timer being responsive to operate said charge means during the brew cycle while said cylinder is in sealing relation on said platform and before said stopper is moved into sealing relation to the upper end of said cylinder.

9. The invention of claim 1 in which the upper end of said cylinder is provided with a flared lip of greater circumference than the circumference of said stopper, and charge means is provided to be operable to deposit coffee and water on said lip, said cycle timer being responsive to operate said charge means during the brew cycle while said cylinder is in sealing relation on said platform and before said stopper is moved into sealing relation to the upper end of said cylinder.

10. The invention of claim 1 in which said coffee discharge opening is much smaller in area than the area of said filter screen to thereby provide a resistance to the flow of brewed coffee through said screen.

11. The invention of claim 1 in which said platform is provided with a gasket surface surrounding said screen and adapted to engage the lower end of said cylinder in the sealing relation.

12. The invention of claim 1 in which means is provided to regulate the pressure of air passed through said stopper by said third means to prevent excessive pressure in the brew cylinder tending to unseat the stopper during the brew cycle.

13. The invention of claim 1 in which said cylinder is pivotally mounted on one end of at least one arm that is pivotally mounted at its other end on said frame, said first means being connected to said arm at a point intermediate its length in a manner to move said arm to or from said platform as said first means is to be operated, and guide means is provided interconnecting the lower end of said cylinder and said frame to guide the movement of the lower end of said cylinder towards said platform.

References Cited

UNITED STATES PATENTS

| 2,827,845 | 3/1958 | Richeson | 99—289 X |
| 2,887,038 | 5/1959 | Rosander | 99—307 |
| 2,899,885 | 8/1959 | Thompson | 99—289 |
| 3,122,988 | 3/1964 | Rota | 99—302 |
| 3,369,478 | 2/1968 | Black | 99—302 X |
| 3,426,670 | 2/1969 | Wittern | 99—283 X |

ROBERT W. JENKINS, Primary Examiner

U.S. Cl. X.R.

99—302